US009975162B2

(12) United States Patent  
Ludlow et al.

(10) Patent No.: US 9,975,162 B2  
(45) Date of Patent: May 22, 2018

(54) LIP SKIN SECTOR AND A METHOD AND APPARATUS FOR FORMING A LIP SKIN SECTOR

(71) Applicant: ROHR, INC., Chula Vista, CA (US)

(72) Inventors: Michael Ludlow, Belfast (GB); David McCracken, Belfast (GB)

(73) Assignee: Rohr, Inc., Farmington, CT (US)

( * ) Notice: Subject to any disclaimer, the term of this patent is extended or adjusted under 35 U.S.C. 154(b) by 293 days.

(21) Appl. No.: 14/764,778

(22) PCT Filed: Jan. 30, 2014

(86) PCT No.: PCT/EP2014/051853  
§ 371 (c)(1),  
(2) Date: Jul. 30, 2015

(87) PCT Pub. No.: WO2014/118300  
PCT Pub. Date: Aug. 7, 2014

(65) Prior Publication Data  
US 2015/0367395 A1    Dec. 24, 2015

(30) Foreign Application Priority Data  
Jan. 30, 2013 (GB) .................................. 1301627.4  
Jul. 17, 2013 (GB) .................................. 1312802.0

(51) Int. Cl.  
*B21D 22/02* (2006.01)  
*B21D 53/92* (2006.01)  
(Continued)

(52) U.S. Cl.  
CPC .............. *B21D 22/02* (2013.01); *B21D 25/02* (2013.01); *B21D 25/04* (2013.01); *B21D 53/92* (2013.01)

(58) Field of Classification Search  
CPC . B21D 5/01; B21D 5/04; B21D 25/00–25/04; B21D 19/12; B21D 22/02  
See application file for complete search history.

(56) References Cited

U.S. PATENT DOCUMENTS

| 5,035,133 A | 7/1991 | White |
| 2011/0162429 A1* | 7/2011 | Leacock ................ B21D 25/02 72/296 |

FOREIGN PATENT DOCUMENTS

| WO | 2010003538 | 1/2010 |
| WO | 2012116999 | 9/2012 |

OTHER PUBLICATIONS

International Search Report dated May 21, 2014.  
International Preliminary Report on Patentability dated May 21, 2015.

* cited by examiner

*Primary Examiner* — R.K. Arundale  
*Assistant Examiner* — Pradeep C Battula  
(74) *Attorney, Agent, or Firm* — Snell & Wilmer L.L.P.

(57) ABSTRACT

An apparatus for forming a sector of an annular component having an arrangement for securely retaining at least a portion of a blank mountable thereon. The retaining arrangement is adapted for leaving a portion of the retainable blank accessible. A punch is provided having an external surface contour shaped to correspond to the shape of all or a part of the profile of the sector of the annular component from a trailing edge to a leading edge and/or from a leading edge to an inlet edge. The apparatus has a cooperating forming arrangement for forming the profile of the sector of the annular component from the leading edge to the inlet edge. The retaining arrangement is adapted for forming a clamping boundary enclosing the accessible part of the blank to be formed by the punch.

20 Claims, 11 Drawing Sheets

(51) Int. Cl.
*B21D 25/02* (2006.01)
*B21D 25/04* (2006.01)

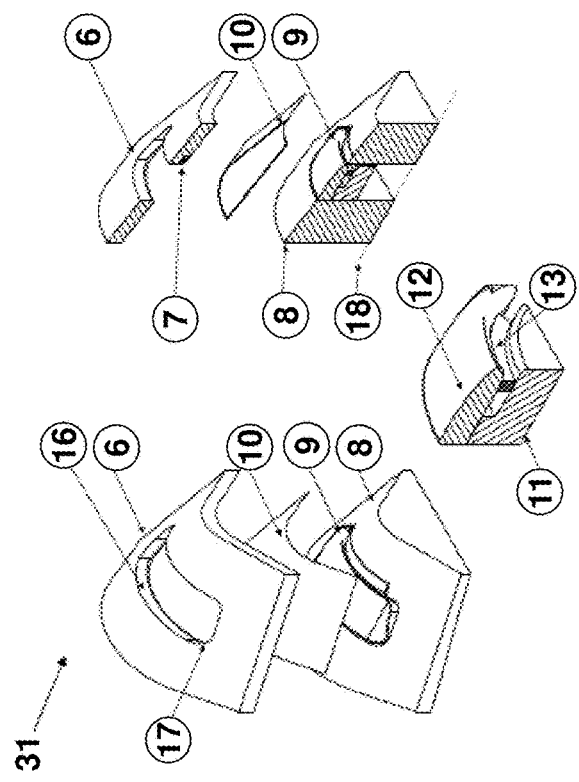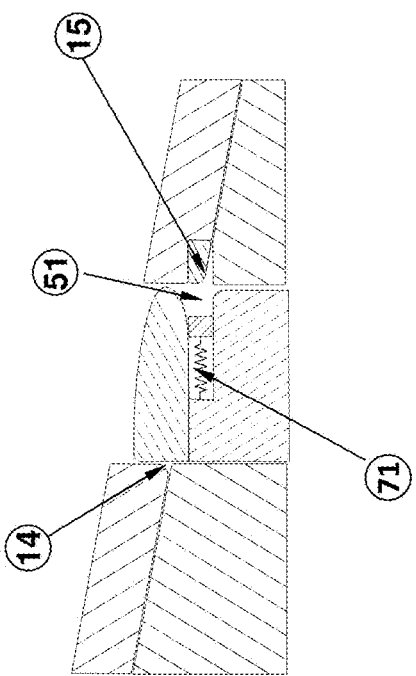

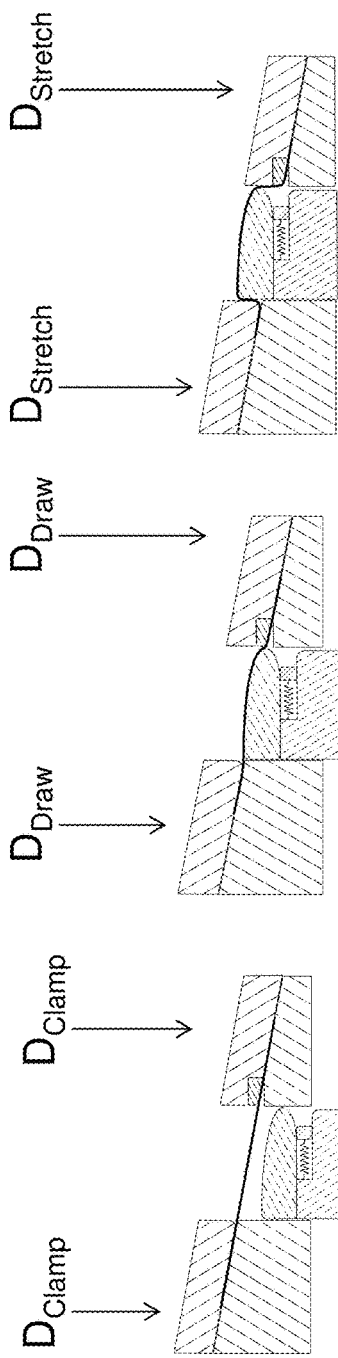
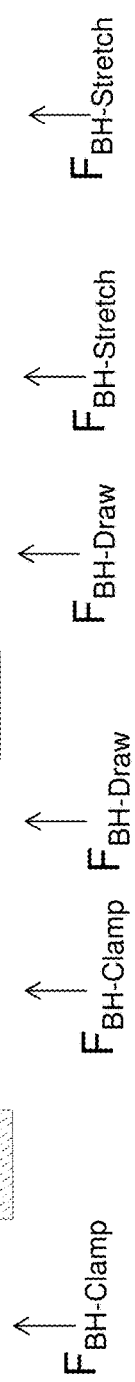
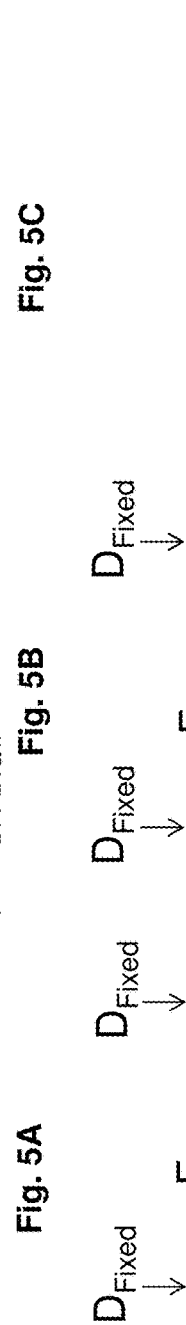
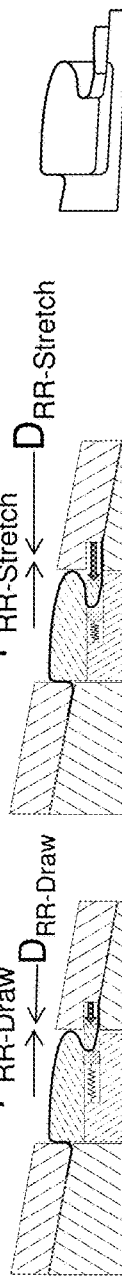
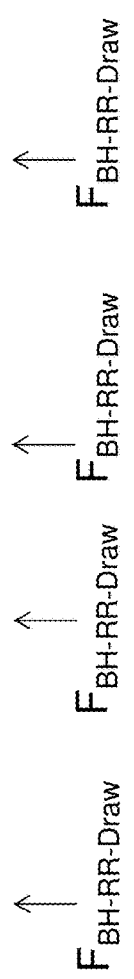

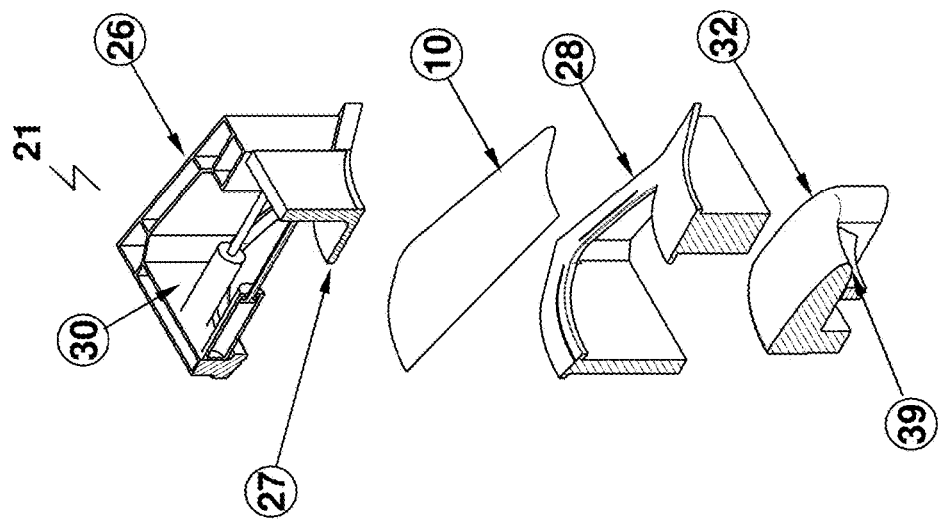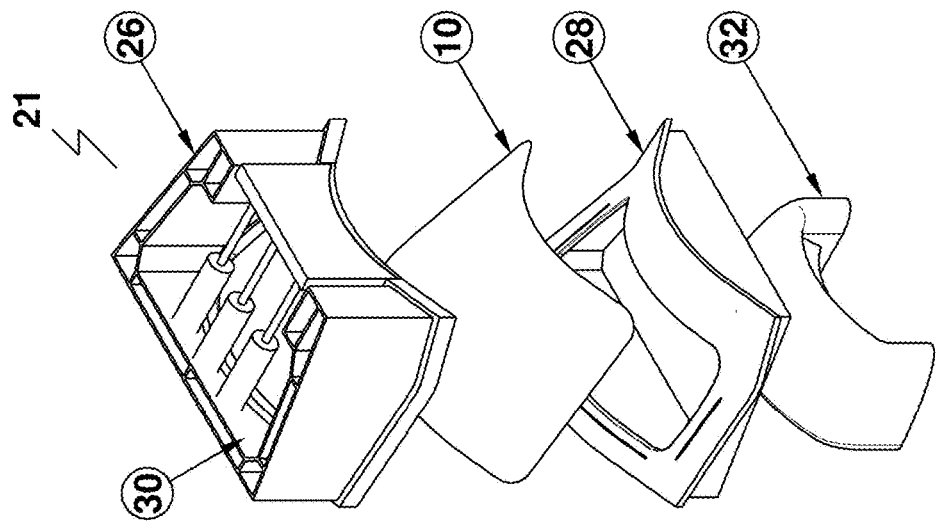

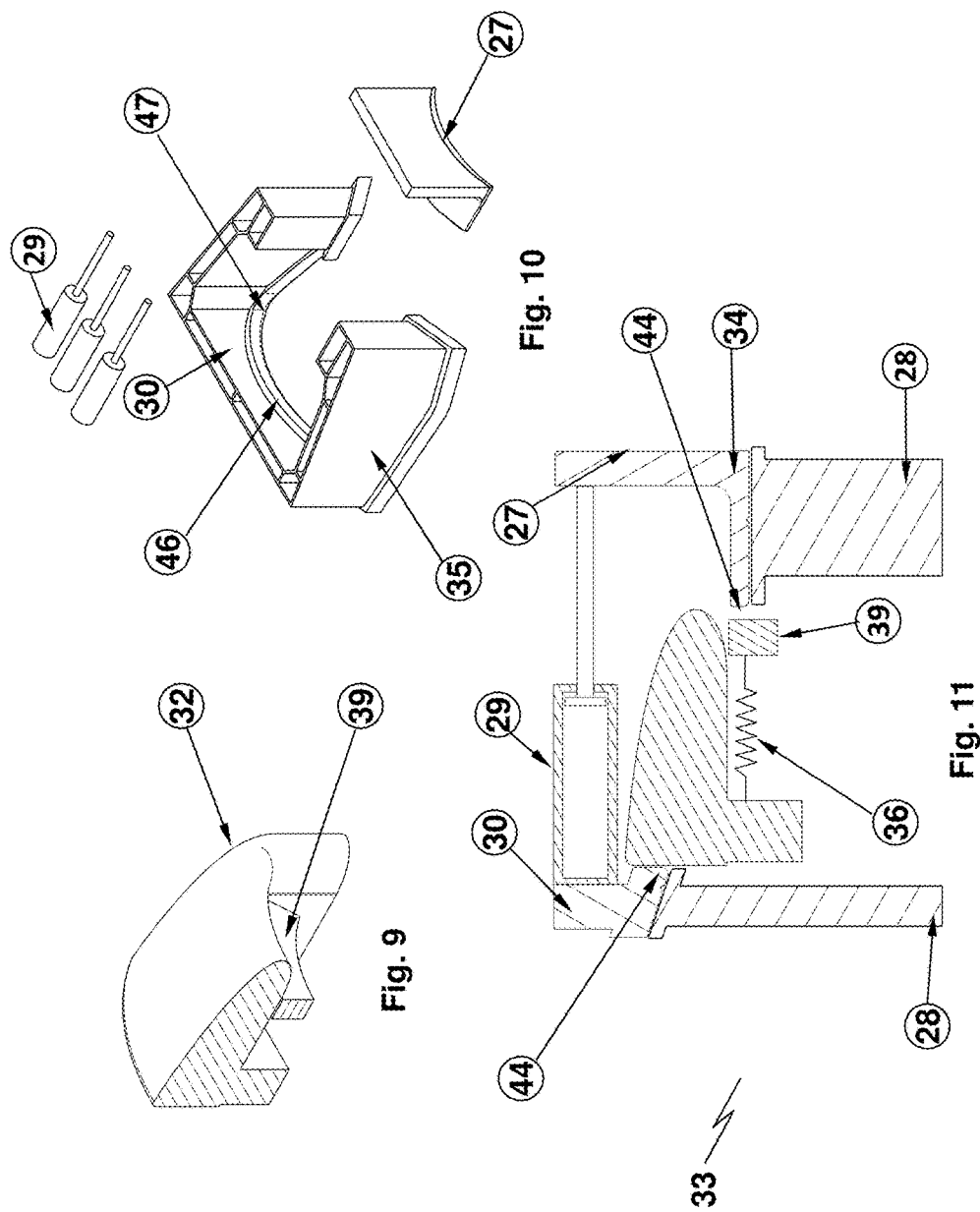

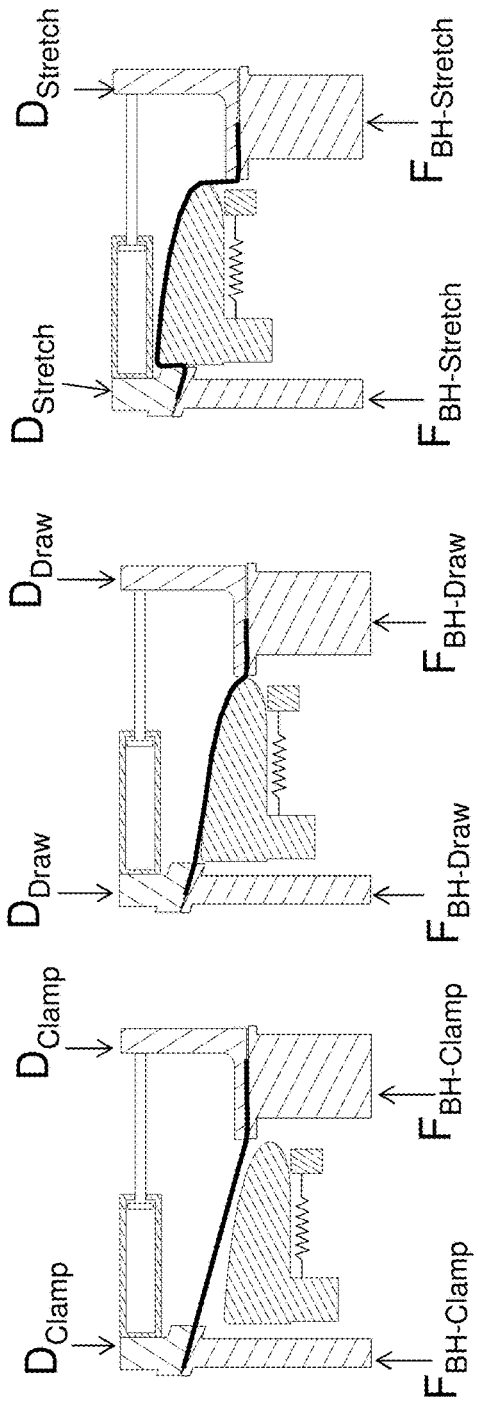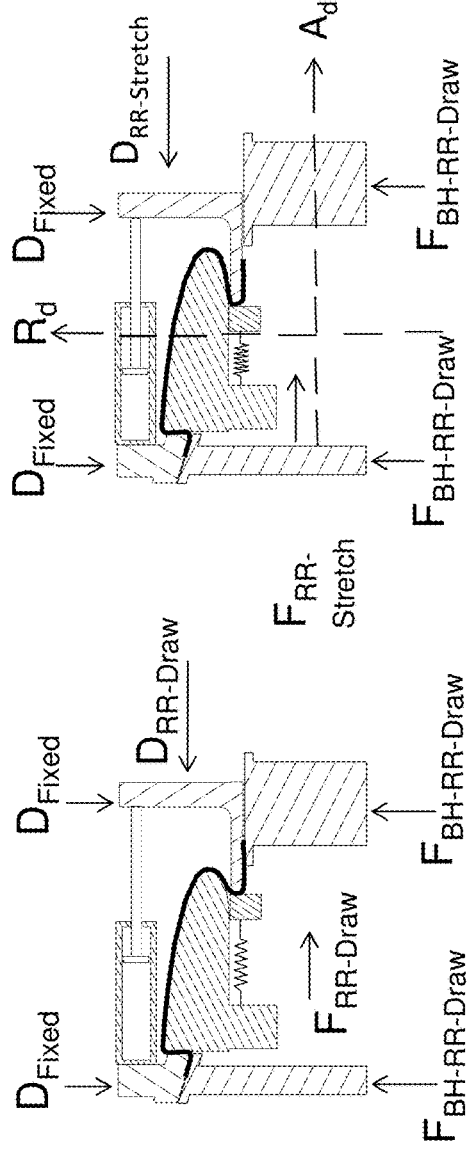

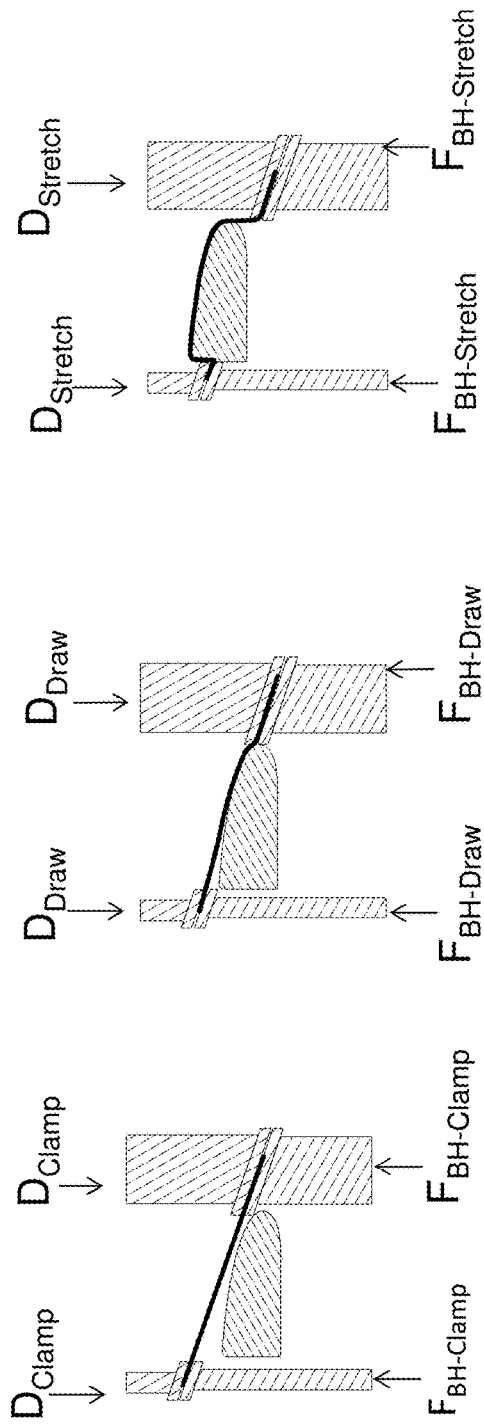
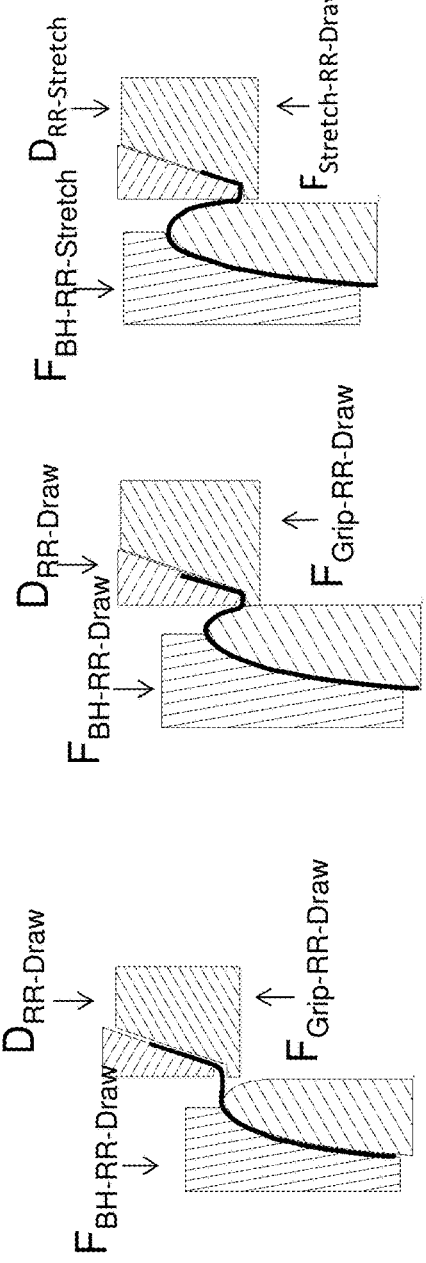

LIP SKIN SECTOR AND A METHOD AND APPARATUS FOR FORMING A LIP SKIN SECTOR

CROSS-REFERENCE TO RELATED APPLICATION

The instant application is a national phase of PCT International Application No. PCT/EP2014/051853 filed Jan. 30, 2014, and claims priority to GB Patent Application Serial No. 1301627.4 filed Jan. 30, 2013, and GB Patent Application Serial No. 1312802.0 filed Jul. 17, 2013, the entire specifications of all of which are expressly incorporated herein by reference.

This invention relates to a lip skin sector and to a method and apparatus for forming a lip skin sector. A lip skin is the mechanical component surrounding the inlet opening of an aircraft nacelle. The nacelle generally has a thin, aerodynamically shaped metal skin covering the jet engine of the aircraft. The lip skin is generally comprised of a single piece or multiple sectors and the main features of the lip skin are a smooth outer trailing edge which must be free from irregularities and discontinuities to reduce drag and to avoid the creation of turbulence. An inner inlet edge which is typically shaped to attenuate noise from the engine by shielding fan noise and to guide the flow of air into the engine, and a leading edge or lip, which provides a smooth transition between the outer trailing edge and the inner inlet edge while creating a small frontal area to reduce drag.

The complex three dimensional compound curvature shape of the lip skin typically requires a complex multi-stage forming process, often requiring intermediate heat treatments. Typically lip skins are produced by multiple stage deep drawings or spin forming processes, requiring complex and costly tooling and time consuming multi-step processing with intermediate heat treatments. Due to aerodynamic and noise considerations, it is particularly desirable to extend the outer trailing edge of the lip skin as far as possible, known as extended trailing edges wherein the axial length of the outer trailing edge of the lip skin can be much greater than axial length of the inner inlet edge. Known deep drawing processes are unsuitable for the manufacture of such extended trailing edges.

A typical lip skin of an extended inlet cowl is illustrated in Figure A of the drawings. The main features of an inlet cowl are the:
1. Trailing edge;
2. Inlet edge;
3. Leading edge;
4. Arc or sector definition; and,
5. Centre line extending in the axial direction The method and apparatus of the present invention can be used for standard inlet cowl sectors where the axial distance between features 1 and 3 is similar to that between features 2 and 3. The process can also be used for laminar flow inlet cowls where the axial distance from features 1 to 3 is much greater than that from features 2 to 3. The overall size of the sector is determined by the blank size referred to as Item 10 in the FIGS. 2 and 3.

One object of the present invention is to provide a sector of a lip skin and a method and apparatus for forming a sector of a lip skin with an extended outer portion to increase the extent of laminar flow over the outer surface of the nacelle and thus remove any flow interruptions. However, the present invention is equally applicable to standard inlet cowl sectors.

Accordingly, the present invention provides an apparatus for forming a sector of an annular component comprising means for securely retaining at least a portion of a blank mountable thereon, the retaining means being adapted to leave a portion of the retainable blank accessible, a punch having an external surface contour shaped to correspond to the shape of all or a part of the profile of the sector of the annular component from a trailing edge to a leading edge and/or from a leading edge to an inlet edge, the punch and/or the retaining means being capable of radial movement so that the punch is capable of coming into contact with the accessible portion of the blank for forming the blank from the trailing edge to the leading edge, the retaining means being adapted to allow controlled flow of the blank material through the retaining means as the punch comes into contact with the blank for draw forming the blank across the punch, the apparatus having cooperating forming means for forming the profile of the sector of the annular component from the leading edge to the inlet edge, characterized in that the retaining means is adapted to form a clamping boundary enclosing the accessible part of the blank to be formed by the punch.

Ideally, the retaining means is adapted to create a continuous clamping boundary enclosing the accessible part of the blank to be formed by the punch.

Preferably, the retaining means forms a frame enclosing the accessible part of the blank to be formed by the punch.

Ideally, the retaining means forms a continuous frame enclosing the part of the blank to be formed by the punch.

Advantageously, the use of a clamping boundary enclosing the part of the blank to be formed means that the blank will draw in a substantially uniform manner through this clamping boundary as the punch comes into contact with the blank. This provides a major advantage over existing technologies for forming a sector of an annular component such as a lip skin of a nacelle where only leading edges and trailing edges of the blank sector are gripped in the prior art forming processes. In the main, it prevents warping along the edges of the blank sector that are not gripped. This reduces the amount of manual work required to finish the formed sector of the lip skin and also reduces the risk of material deformation or degradation as a result of warping or wrinkling along the edges.

Ideally, the cooperating forming means are operable as the retaining means and the punch are held in a fixed position relatively.

Preferably, the cooperating forming means are operable in combination with the retaining means and the punch.

Ideally, the cooperating forming means are adjustable in an axial direction defined by a centre-line.

Preferably, the cooperating forming means are adjustable in a direction from the leading edge to the inlet edge of the formed sector.

Preferably, the apparatus comprises actuation means for facilitating radial movement of the punch and/or retaining means.

Ideally, the apparatus comprising actuation means for facilitating axial movement of the cooperating forming means along at least part of its travel.

Ideally, the retaining means being adapted to define a gap for facilitating location of the punch.

In use, the blank is formed into a sector of an annular component such as an inlet cowl/lip skin of an aircraft nacelle in a two stage forming process.

In a second embodiment of the invention, at least part of the retaining means is also capable of operating as at least part of the cooperating forming means for draw forming the sector of the annular component from the leading edge to the inlet edge.

Preferably, the retaining means comprises a blank holder and a die.

Ideally, at least part of the blank holder has an external surface contour corresponding to the surface contour of a formed sector mountable thereon.

Preferably, the die is a die plate.

Ideally, the die plate has an internal surface contour corresponding to the surface contour of a formed sector mountable between the blank holder and the die.

Ideally, the external surface contour of the blank holder and the internal surface contour of the die correspond as closely as possible to the surface contour of the formed sector of the annular component. Advantageously, this means that the forces being applied to the blank from the relative radial movement of the retaining means and the punch, as the punch comes into contact with the blank are as evenly distributed as possible. This means that the flow of blank material from between the blank holder and die will also be as uniform as possible. Again, this mitigates as far as possible the risk of deformation or damage to the material properties as a result of uneven strains applied by the forming tools to the material.

Ideally, at least part of the die plate has the shape of an outer wall of a frusto conical body sectioned at or about its longitudinal axis.

Preferably, the surface of the die plate contactable with the blank is cast or machined.

Preferably, the die plate is supported by an additional cast or machined structure that transfers the force from the die plate to the press system.

Ideally, the die plate surface for engaging the blank is conically contoured. Advantageously, the die plate surface is designed to ensure an even draw over the surface of the punch while providing sufficient clearance to re-draw the internal surface using the cooperating forming means.

Preferably, the die plate has linear extensions on each side.

Preferably, the die plate has a cut out.

Ideally, the cut out is in the centre of the die. Advantageously, the central location of the cutout allows a uniform amount of material to be clamped around the cutout thereby ensuring an even draw of blank material around the punch.

Preferably, the shape of the cut out is designed to match the shape of the punch with a small clearance for the blank material thickness.

Preferably, the corners of the cut out are rounded. Advantageously, this ensures sufficient material flow which also minimises wrinkling.

Ideally, at least part of the internal peripheral surface of the cut out is rounded by a radius for providing controlled material flow during the drawing operation.

Preferably, the boundary between the internal surface of the die plate and the part of the internal peripheral surface of the cutout proximal to the blank is rounded by a radius for providing controlled material flow during the draw forming operation.

In the second embodiment, the retaining means comprises a blank holder and a die.

In the second embodiment, the die has a movable portion capable of being moved relative to the remainder of the die when the blank is clamped between the die and blank holder.

In the second embodiment, the movable portion of the die is located proximal to the leading edge of the die. By leading edge of the die we mean the edge of the die proximal to the leading edge of the punch and the leading edge of the blank to be formed into a sector of an annular component such as a lipskin.

In the second embodiment, the movable portion of the die is movable by powered actuation means.

In the second embodiment, the powered actuation means is operable between the movable portion and another portion of the die.

In the second embodiment, the movable portion of the die provides a part of the cooperating forming means.

In the second embodiment, the movable portion of the die is movable in a direction from the leading edge to the inlet edge of the sector of the annular component for draw forming this part of the blank.

In the second embodiment, the die comprises a die plate and a support means around all or part of the perimeter of the die plate. Advantageously, the support means provides structural support for the die plate for transferring the clamping forces being applied though the die to clamp the blank between the die and the blank holder and for absorbing the actuation forces being applied through the support means to allow the movable portion of the die to be activated.

In the second embodiment, all or part of clamping surfaces of the movable portion of the die and the mutually opposing clamping surface of the blank holder are planar, most preferably horizontal planar clamping surfaces.

In the second embodiment, the punch comprises an internal grip.

In the second embodiment, the internal grip has an arcuate profile that matches the internal profile of the forming punch.

In the second embodiment, the internal grip can move in the axial direction with a resisting force provided by an integrated actuation system or biasing means such as one or more springs.

In the second embodiment, the internal grip provides the second part of the cooperating forming means working together with the movable portion of the die.

In the second embodiment, the internal grip is alignable with the movable portion of the die as the punch forms the trailing edge to the leading edge of the lipskin sector.

Ideally, the punch has an outer surface contour and a forming end shaped to correspond to the finished shape of the profile of the sector of the annular component from the trailing edge to the inlet edge.

Ideally, the annular component is a lip skin for an aircraft nacelle.

While composite materials can be used for many parts of the nacelle, the lip skin must generally be made from a metal, such as aluminum or titanium, to be able to withstand impacts upon the leading edge or lip thereof. The titanium is also useful in view of recently legislated stringent de-icing requirements requiring higher temperatures at the nacelle leading edge.

Preferably, the forming end of the punch has an arcuate shape.

Preferably, the punch has an external surface shaped to provide the profile of the formed sector of a lip skin.

Ideally, the external surface of the punch is optimized for springback.

Preferably, the external surface of the punch has a high surface finish.

Advantageously, the high surface finish value reduces friction during forming.

Ideally, the actuation means is a hydraulic or electromechanical actuation system.

Preferably, the punch and/or the retaining means is mechanically coupled to the actuation means Ideally, the blank holder has a cast or machined surface to match the surface of the die.

Preferably, the blank holder and die are designed to match with clearance for the blank thickness.

Ideally, the blank holder has the shape of a frusto conical body sectioned at or about its longitudinal axis.

Preferably, the surface of the blank holder contactable with the blank is cast or machined.

Ideally, the blank holder surface for engaging the blank is conically contoured. Advantageously, the blank holder surface is designed to ensure an even draw over the surface of the punch while providing sufficient clearance to re-draw the internal surface using the cooperating forming means.

Ideally, the blank holder and/or the die is initially movable for clamping the blank, most preferably in a vertical axis. Advantageously, this ensures an even contact pressure over the entire blank surface. This is one important aspect of ensuring even flow of blank material during the draw forming process.

Ideally, the blank holder has a cutout defining the gap and being formed for alignment with the cutout of the die in use.

Preferably, the blank holder cutout/gap is formed for receiving the punch.

Preferably, the cooperating forming means comprises a re-draw ring sector being movably mounted on the retaining means facing the punch for insertable movement into the punch.

Ideally, the retaining means has a cavity formed for receiving the re-draw ring sector opening towards the punch.

In use, the redraw ring sector is designed to draw the internal profile of the sector of the annular component from the leading edge to the inlet edge while ensuring the blank does not wrinkle or rip.

Preferably, the outer curved surface of the re-draw ring sector is designed to match the internal profile of the punch with clearance for the material thickness.

Ideally, the internal curved surface of the re-draw ring sector is designed to match the surface of the blank holder.

Preferably, the leading edge of the re-draw ring sector between the outer curved surface and the internal curved surface is rounded by a radius. Advantageously, the size of the radius ensures that the blank can re-draw around the ring without ripping or wrinkling.

Ideally, the re-draw ring sector is driven by an integrated actuator system or by a series of cam dies from a main press.

Ideally, the punch comprises a punch sub-assembly.

Preferably, the punch sub-assembly comprises an internal support, the forming punch and an internal grip.

Ideally, the forming punch and the internal support define an axial arcuate channel opening towards the redraw ring sector.

Preferably, the punch has an axial arcuate channel opening towards the redraw ring sector.

Ideally, the punch has an internal grip in the axial arcuate channel.

Preferably, the axial arcuate channel is alignable with the redraw ring sector.

Preferably, the axial arcuate channel is formed for receiving at least part of the redraw ring sector for forming the sector of the annular component between the leading edge and the inlet edge.

Ideally, the internal support supports the forming punch and the internal grip.

Preferably, the external surface of the forming punch is designed to match the internal surface of a sector of the inlet cowl.

Ideally, the forming punch is extended on each side beyond the segment in order to minimise the distortion along the edges of the part.

Preferably, the forming punch axial length is extended beyond the trailing edge of the desired sector to minimise final part distortion.

Ideally, the internal grip has an arcuate profile that matches the internal profile of the forming punch.

Preferably, the internal grip can move in the axial direction with a resisting force provided by an integrated actuation system or biasing means such as springs.

Preferably, the blank is produced from a single sheet or several joined sheets. The joint is normally achieved using the friction stir welding process although linear friction and other high formability high quality welding processes can also be used to form the frusto-conical blank.

Ideally, the profile of the punch is designed to match the profile of the lip skin with allowance for springback where required.

Preferably, the trailing edge of the punch has a radius. Advantageously, the size of the radius ensures that the blank can draw around the punch without ripping or wrinkling.

In a third embodiment of apparatus for forming lip skin sector, the apparatus comprises two separate draw forming tools.

Ideally, the first tool has a blank holder and die for retaining a blank there between with alignable cutouts respectively for receiving punch. In view of the fact that a second tool is used, no cooperating forming arrangement is included in the first tool.

Preferably, a second tool comprises a sector of a punch formed for receiving the partially formed lip skin sector, the form of the arcuate leading edge of the punch sector corresponding closely to the form of the leading edge of the punch of the first tool so as to neatly accommodate the partially formed lip skin sector.

Preferably, a clamping ring sector has an interior curved surface formed for nesting engagement with the exterior curved surface of the punch with clearance for the thickness of the blank. In use an operator removes the partially formed blank from the first tool and sets it onto the punch of the second tool. The operator actuates a powered actuation system to move the clamping ring sector and/or punch so as to bring the blank into engagement with the clamping ring sector.

Ideally, a cooperating forming arrangement in the form of a pair of cooperating gripping ring sectors are provided for draw forming the blank from the leading edge to the inlet edge of the lip skin sector.

Preferably, a first gripping ring sector is an internal gripping ring sector having an external curved surface formed for engaging the internal surface of the blank.

Ideally, a second gripping ring sector is an external gripping ring sector having an internal curved surface formed for engaging the external surface of the blank.

Ideally, external gripping ring sector has an interior curved surface formed for nesting engagement with the exterior curved surface of the internal gripping ring sector with clearance for the thickness of the blank. The operator actuates a powered actuation system to move the internal griping ring sector into engagement with the blank and then moves the external gripping ring sector into engagement with the blank. The leading edge of the gripping ring sector is radiused to allow the blank to flow through and around the leading edge during the redraw forming process.

Accordingly, the present invention provides a method of forming a sector of an annular component such as an inlet cowl/lip skin of a nacelle for an aircraft engine, the method comprising the steps of clamping at least part of a blank along a clamping boundary in a retaining means so as to leave a portion of the blank exposed within the clamping boundary, moving a punch and/or retaining means radially so that the punch comes in to contact with the exposed portion of the blank and through the main body of the exposed blank thereby drawing the blank onto an external surface of the punch forming the sector from the leading edge to the trailing edge, activating cooperating forming means for engaging the blank and drawing the blank over the punch forming the sector of the inlet cowl from the leading edge to the inlet edge.

Ideally, the method comprising the steps of clamping at least part of a blank along a continuous clamping boundary in a retaining means so as to leave a portion of the blank exposed within the clamping boundary.

Preferably, the method comprising clamping at least part of the blank along a clamping boundary in a retaining means enclosing the portion of the exposed blank.

Ideally, the method comprising shearing the partly formed blank along two axial lines.

Preferably, the method comprising radially moving the retaining means and/or the punch so that a redraw ring sector aligns with an arcuate channel of a punch and actuating the redraw ring sector so that it moves axially into the arcuate channel for engaging the blank and drawing the blank over the punch forming the sector of the inlet cowl from the leading edge to the inlet edge.

In an alternative method step for draw forming the sector of the annular component from the leading edge to the inlet edge, the method comprising moving a movable portion of the die axially towards the remaining part of the die under powered actuation means. In this method, the movable part of the die acts as part of the cooperating forming means.

Ideally, the method comprising placing the blank between a blank holder and die before closing the blank holder and die together.

Preferably, the method comprising closing the die and applying a closing force to the blank holder and/or die during this closing stage.

Preferably, the method comprising drawing the blank over the punch by a predetermined distance while maintaining the closing force.

Advantageously, the blank is free to draw in a controlled fashion from between the blank holder and die through a die cavity.

Ideally, the method comprising increasing the blank holder/die load upon reaching a predetermined draw depth while stretching the blank from all sides over the punch by a predetermined distance.

Preferably, the method comprising limiting the drawing of the blank from between the blank holder and die during the stretching process. At this stage, the profile of the sector of the annular component from the leading edge to the trailing edge is formed.

Ideally, the method comprising shearing the blank along two axial lines either in the tooling system or by removing the part from the tooling system and using either a manual or CNC cutting process. If the material removal process occurs outside the tool system, the blank is then placed back into the tooling system or into another tool.

Ideally, the method comprising fixing the die in the locked position and forcing the re-draw ring sector or movable portion of the die into a punch by a predetermined distance under a predetermined blank holder/die load.

Preferably, the method comprising contacting the re-draw ring sector or movable portion of the die against an internal grip providing a reaction load which then reduces or eliminates the draw of the blank between the internal grip and the re-draw ring sector/movable portion of the die.

Preferably, the method comprising removing the blank by removing all holding forces, retracting the re-draw ring sector and lifting the die clear.

Ideally, the method comprising trimming the blank using either a manual or CNC cutting process.

According to a further aspect of the present invention, there is provided a sector of an annular component produced by the method outlined above.

The invention will now be described with reference to the accompanying drawings, which show by way of example only three embodiments of an apparatus and method for forming a sector of an annular member such as a lip skin for a nacelle and the sector itself. In the drawings:—

Figure A is a sectional perspective view of an extended inlet cowl of a nacelle for an aircraft engine;

FIG. 2 is a sectional perspective view of a punch sub-assembly for forming a sector of a lip skin;

FIG. 3 is an exploded sectional perspective view of an apparatus for forming a sector of a lip skin;

FIG. 4 is a vertical section view of an apparatus for forming a sector of a lip skin;

FIGS. 4A to 4E are vertical section views of the apparatus for forming a sector of a lip skin in first to fifth stages respectively of the forming process;

FIG. 4F is a perspective view of the blank after the forming process and prior to trimming;

FIGS. 5A to 5E are perspective views of a sector of a frusto-conical blank at first to fifth stages respectively of the forming process;

FIG. 5F is a perspective view of a formed sector of inlet cowl after the forming process.

FIG. 7 is a section of the perspective view of FIG. 6;

FIG. 8 is a detail section view of the punch assembly of FIGS. 6 and 7;

FIG. 9 is an exploded detail view of a second embodiment of die plate and cooperating forming arrangement;

FIG. 10 is a sectional elevation view of the second embodiment of apparatus;

FIGS. 11A to 11E are vertical section views of the apparatus for forming a sector of a lip skin in first to fifth stages respectively of the forming process;

FIGS. 12A to 12E are perspective views of a sector of a frusto-conical blank at first to fifth stages respectively of the forming process;

FIG. 12F is a perspective view of a formed sector of inlet cowl after the forming process.

Figure 17:
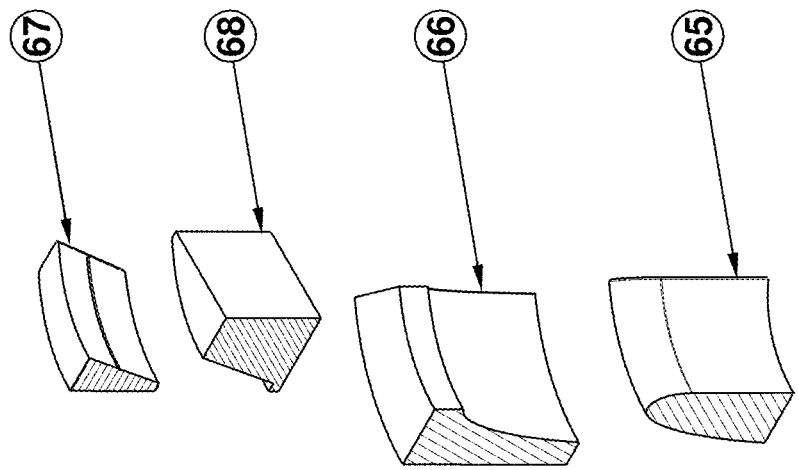

FIGS. 17A to 17C are vertical section views of the apparatus for forming a sector of a lip skin in first to third stages respectively carried out on the first tool of the two tool forming apparatus of the third embodiment; and FIGS. 17D to 17F are vertical section views of the apparatus for forming a sector of a lip skin in fourth to sixth stages respectively carried out on the second tool of the two tool forming apparatus of the third embodiment.

Referring to the drawings and initially to FIGS. 1 to 4F, there is shown an apparatus indicated generally by the reference 31 for forming a sector of a lip skin of an aircraft nacelle. The apparatus 31 has a die plate 6 having a cast or machined surface supported by an additional cast or machined structure, not shown that transfers the force from the die plate 6 to a press system. The surface of the die plate 6 is made from a conic section with linear extensions on each side. The die plate surface is designed to ensure an even draw over the surface of a punch 12 while providing sufficient clearance to re-draw the internal surface using redraw ring sector 7. The shape of a cut out 16 in the centre of the die plate 6 is designed to match the shape of the punch 12 with a small clearance for the material blank thickness. The corners of the cut out 16 are rounded 17 to ensure sufficient material flow that also minimises wrinkling. The internal peripheral surface of the cutout 16 is rounded by a radius 14 to provide controlled material flow during the drawing operation.

The re-draw ring sector 7 is movably mounted on the die plate 16 of the retaining arrangement 6, 8 facing a gap 51 for insertable movement into the gap 51. The redraw ring sector 7 is a semi arcuate member designed to draw the internal profile from the leading edge 3 to the inlet edge 2 while ensuring the blank 10 does not wrinkle or rip. The outer curved surface of the re-draw ring sector 7 is designed to match the internal profile of the punch 12 with clearance for the material thickness. The front of the re-draw ring sector 7 is rounded by radius 16 the size of which ensures that the blank 10 can re-draw around the ring sector 7 without ripping or wrinkling. The re-draw ring sector 7 can be driven by an integrated actuator system or by a series of cam dies from the main press.

The blank holder 8 has a cast or machined surface to match the die plate 6. The blank holder 8 and die 6 are designed to match with clearance for the blank thickness. The main action of closing the blank holder 8 relative to the die 6 occurs in a vertical axis.

The punch 12 comprises a punch sub-assembly having three main components, the internal support 11, punch 12 and internal grip 13. The internal support 11 supports the punch 12 and the internal grip 13. The external surface of the punch 12 is designed to match the internal surface of the inlet cowl up to 120 degree segments. The punch 12 is extended on each side beyond the 120 degree segment in order to minimise the distortion along the edges of the part. The punch axial length is extended beyond the trailing edge to minimise final part distortion. The internal grip 13 has an arcuate profile that matches the internal profile of the punch 12. The internal grip 13 can move in the axial direction 18 with a resisting force provided by an integrated actuation system or mechanical spring 71. The blank 10 is a profiled sheet material.

The processing steps are shown in FIGS. 4A to 4F and the corresponding changes in the blank shape are shown in FIGS. 5A to 5F. The blank 10 is placed between the blank holder 8 and die 6 before closing see FIGS. 4A and 5A. The die 6 or blank holder 8 is then closed vertically. During this closing stage a force FBH-Clamp is applied to the blank holder 8 by a die cushion action from the die 6 or an additional actuation system in a preferably vertical direction 18. The blank 10 is then drawn over the punch sub-assembly 9 by a distance D Draw as shown in FIG. 4B while applying the force FBH-Draw. The blank 10 is free to draw in a controlled fashion from between the blank holder 8 and die 6 through the die cavity 16 as shown in FIGS. 4B and 5B.

Upon reaching the draw depth D Draw the blank holder 8 load is increased to FBH-Stretch see FIG. 4C while the blank 10 is stretched from all sides over the punch sub-assembly 9 by a distance D Stretch. The blank 10 has minimal draw from between the blank holder 8 and die 6 during the stretching process see FIG. 4C. At this stage the inlet cowl profile from the leading edge 3 to the trailing edge 1 has been formed as shown in FIG. 5C.

The blank 10 is then sheared along two axial lines see FIG. 5D either in the tooling system or by removing the part from the tooling system and using either a manual or CNC cutting process. If the material removal process occurs outside the tool system, the blank is then placed back into the tooling system see FIG. 5D and a load F BH rr Draw is applied. The blank holder 8 and die 6 remain in the D Fixed position while the load FBH-RR Draw is maintained see FIG. 4D while the re-draw ring sector 7 is forced into the punch sub-assembly 9 by a distance DRR-Draw under a spring force load of F RR-Draw see FIG. 4 D.

Once the distance DRR-Draw has been reached the re-draw ring sector 7 contacts the internal grip 13 with a reaction load FRR-Stretch which then reduces or eliminates the draw of the blank 10 between the internal grip 13 and the re-draw ring sector 7. The blank 10 is then formed under tension for the remainder of the motion DRR-Stretch while the forces FBH RR draw and FRR-Stretch are maintained see FIG. 4E. The blank 10 shape is then that shown in see FIG. 5E. The blank 10 is then removed by removing all holding forces, retracting the re-draw ring sector 7 and lifting the die 6 clear as shown in see FIG. 5 F. The blank 10 is then trimmed using either a manual or CNC cutting process see FIG. 5 F.

Referring to the drawings and now to FIGS. 6 to 12, there is shown a second embodiment of apparatus indicated generally by the reference numeral 21 for forming a sector of a standard lip skin and a sector 22 of an extended trailing edge lip skin. In the second embodiment, the retaining arrangement 23 has a blank holder 28 and a die 26. The die 26 has a movable portion 27 capable of being moved relative to the remainder of the die 26 when the blank 10 is clamped between the die 26 and blank holder 28. The movable portion 27 of the die 26 is located proximal to the leading edge of the die 26. By leading edge of the die 26 we mean the edge of the die 26 proximal to the leading edge of the punch 32 and the leading edge of the blank 10 to be formed into a sector 22 of an annular component such as a lipskin. The movable portion 27 of the die 26 is movable by powered actuation members 29, such as hydraulic rams. The powered actuation members 29 are operable between the movable portion 27 and another portion 30 of the die 26, mutually opposing the movable portion 27. The movable portion 27 of the die 26 provides one part of the cooperating forming arrangement indicated generally by reference numeral 33. The movable portion 27 of the die 26 is movable in a direction from the leading edge to the inlet edge of the sector 22 see FIG. 12F of the annular component for draw forming this part of the blank.

The die 26 has a die plate 34, see FIG. 10 and a support member 35 see FIG. 9 around all or part of the perimeter of the die plate 34. In the embodiment shown in the drawings, the support member 35 is provided by a four walled open top box with reinforced corners and walls. Advantageously, the support member 35 provides structural support for the die plate 34 for transferring the clamping forces being applied through the die 26 to clamp the blank 10 between the die 26 and the blank holder 28 and for absorbing the actuation forces being applied by the actuation members 29 through the walls of the support member 35 to allow the movable portion 27 of the die 26 to be activated. The punch 32 has an internal grip 39. The internal grip 39 has an arcuate profile that matches the internal profile of the forming punch 32. The internal grip 39 can move in the axial direction with a resisting force provided by an integrated actuation system or biasing means such as one or more springs 36. The internal grip 39 provides the second part of the cooperating forming arrangement 33 working together with the movable portion 27 of the die 26. The internal grip 39 is alignable with the movable portion 27 of the die 26 as the punch 32 forms the trailing edge to the leading edge of the lipskin sector.

The shape of a cut out 46 in the centre of the die plate 26 is designed to match the shape of the punch 32 with a small clearance for the material blank 10 thickness. The corners of the cut out 46 are rounded 47 to ensure sufficient material flow that also minimises wrinkling. The internal peripheral surface of the cutout 46 is rounded by a radius 44 to provide controlled material flow during the drawing operation. Both the upper and the lower edges of the leading edge of the movable portion 27 of the die 26 have a radius 44. In terms of the meaning of radial and axial direction, arrows Rd and Ad on FIG. 11E indicate the radial and axial directions respectively.

The processing steps are shown in FIGS. 11A to 11F and the corresponding changes in the blank shape are shown in FIGS. 12A to 12F. The blank 10 is placed between the blank holder 28 and die 26 before closing see FIGS. 11A and 12A. The die 26 or blank holder 28 is then closed vertically. During this closing stage a force FBH-Clamp is applied to the blank holder 28 by a die cushion action from the die 26 or an additional actuation system in a preferably vertical direction 18. The blank 10 is then drawn over the punch 32 by a distance D Draw as shown in FIG. 11B while applying the force FBH-Draw. The blank 10 is free to draw in a controlled fashion from between the blank holder 28 and die 26 through the die cavity 46 as shown in FIGS. 11B and 12B.

Upon reaching the draw depth D Draw the blank holder load is increased to FBH-Stretch see FIG. 11C while the blank 10 is stretched from all sides over the punch 32 by a distance D Stretch. The blank 10 has minimal draw from between the blank holder 28 and die 26 during the stretching process see FIG. 11C. At this stage the inlet cowl profile from the leading edge 3 to the trailing edge 1 has been formed as shown in FIG. 12C.

The blank 10 is then sheared along two axial lines see FIG. 12D either in the tooling system or by removing the part from the tooling system and using either a manual or CNC cutting process. If the material removal process occurs outside the tool system, the blank is then placed back into the tooling system see FIG. 12D and a load F BH RR Draw is applied. The blank holder 28 and die 26 remain in the D Fixed position while the load FBH-RR Draw is maintained see FIG. 12D while the movable portion 27 of the die 26 is forced into the punch 32 by a distance DRR-Draw under a spring force load of F RR-Draw see FIG. 11D.

Once the distance DRR-Draw has been reached the movable portion 27 of the die 26 contacts the internal grip 39 with a reaction load FRR-Stretch which then reduces or eliminates the draw of the blank 10 between the internal grip 39 and the movable portion 27 of the die 26. The blank 10 is then formed under tension for the remainder of the motion DRR-Stretch while the forces FBH RR draw and FRR-Stretch are maintained see FIG. 11E. The blank 10 shape is then that shown in see FIG. 12E. The blank 10 is then removed by removing all holding forces, retracting the movable portion 27 of the die 26 and lifting the die 26 clear as shown in see FIG. 12 F. The blank 10 is then trimmed using either a manual or CNC cutting process see FIG. 12 F.

Figure 1:
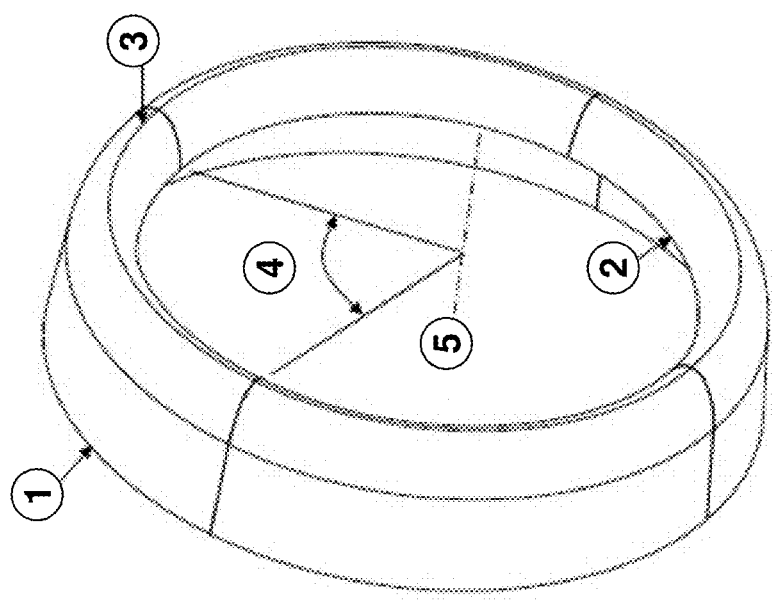
FIG. 1 is an exploded perspective view of an apparatus for forming a sector of a lip skin.
Figure 6A:
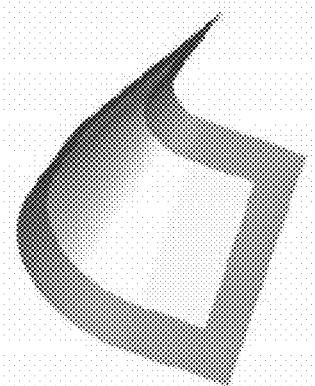
FIG. 6 is an exploded perspective view of a second embodiment of apparatus of the present invention.
Figure 6B:
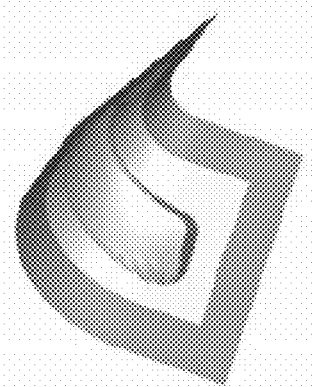
Figure 6C:
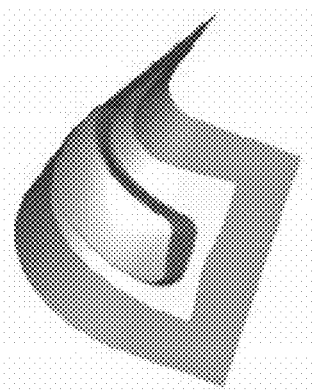
Figure 6D:
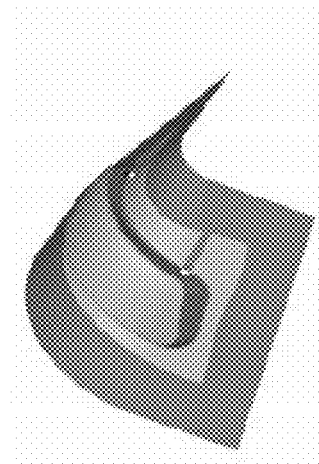
Figure 6E:
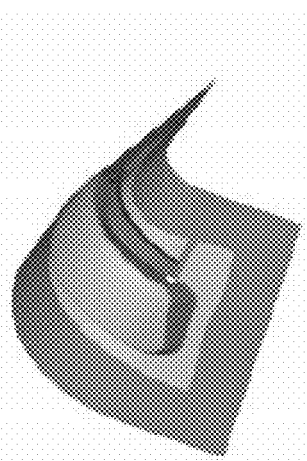
Figure 6F:
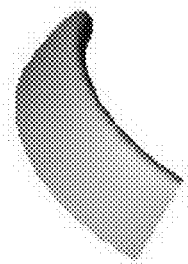
Figure 13C:
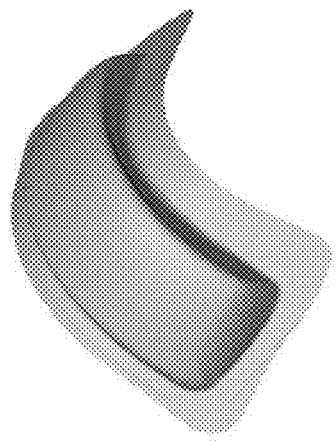
FIG. 13 is an exploded perspective view of a third embodiment showing a first tool of a two tool apparatus.
Figure 13F:
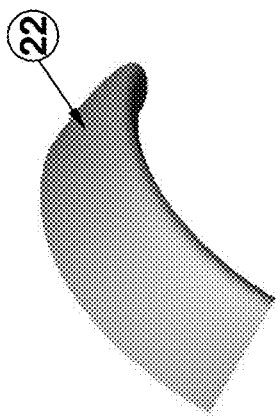
Figure 13B:
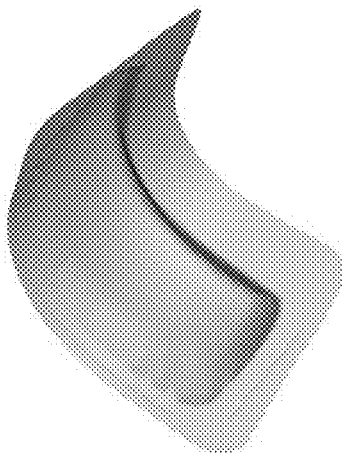
Figure 13E:
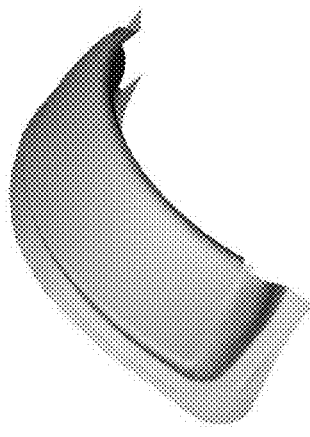
Figure 13A:
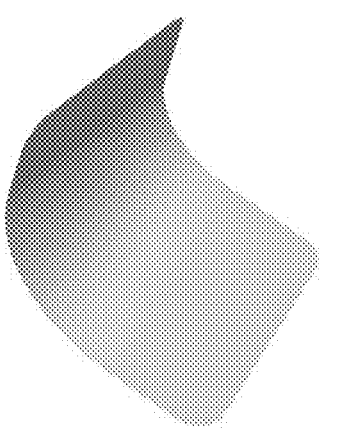
Figure 13D:
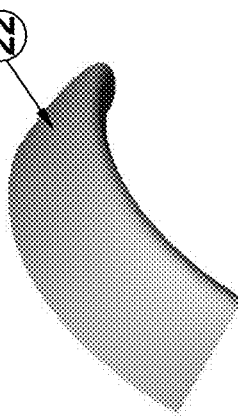
Figure 15:
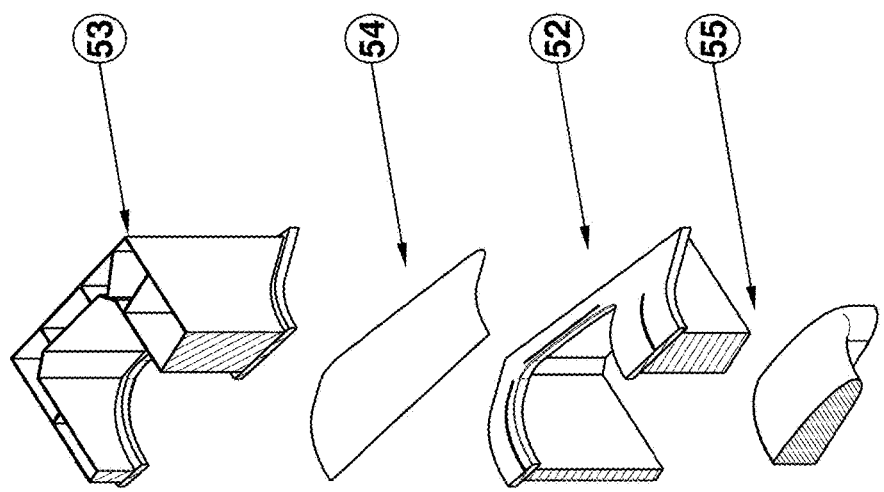
FIG. 15 is an exploded perspective view of the third embodiment showing a second tool of the two tool apparatus.
Figure 16:
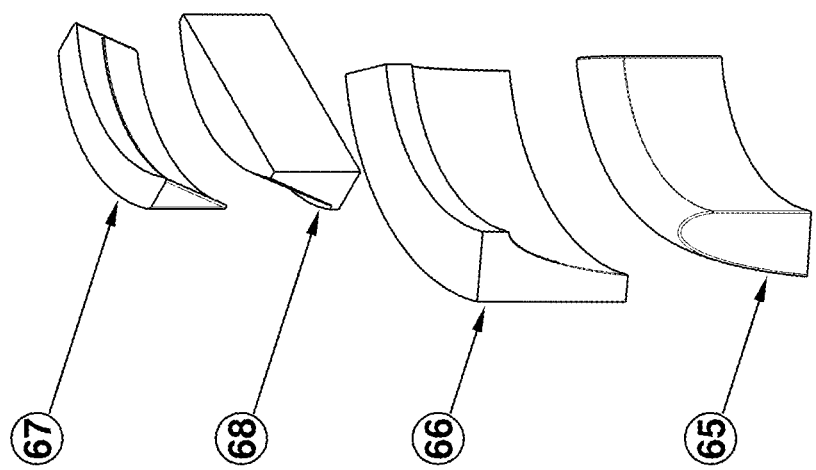
FIG. 16 is a section of the perspective view of FIG. 15.

Referring to the drawings and now to FIGS. 13 to 17, there is shown a third embodiment of apparatus for forming lip skin sector. In the third embodiment, the apparatus has two separate draw forming tools, the first tool 51 having similar components to the components illustrated in FIGS. 6 to 12. The first tool 51 has blank holder 52 and die 53 for retaining a blank 54 there between with alignable cutouts 56, 57 respectively for receiving punch 55. The function of the tool is clearly illustrated in FIGS. 17A to 17C and will be described in greater detail below. In view of the fact that a second tool is used as illustrated in FIGS. 15 and 16 and in FIGS. 17D to 17 F, no cooperating forming arrangement is included in the first tool.

Figure 14:
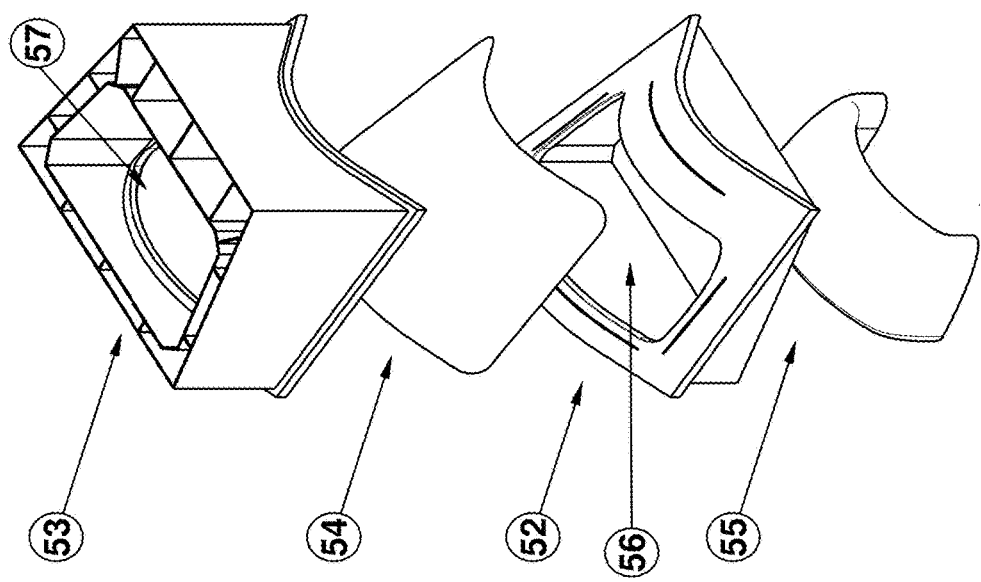
FIG. 14 is a section of the perspective view of FIG. 13.

The second tool illustrated in FIGS. 15 and 16 comprises a sector of a punch 65 formed for receiving the partially formed lip skin sector formed by the tool illustrated in FIGS. 13 and 14. The form of the arcuate leading edge of the punch 65 corresponds closely to the form of the leading edge of the punch 55 so as to neatly accommodate the partially formed lip skin sector. A clamping ring sector 66 has an interior curved surface formed for nesting engagement with the exterior curved surface of the punch 65 with clearance for the thickness of the blank 10. In use an operator removes the partially formed blank from the first tool and sets it onto the punch 65. The operator actuates a powered actuation system to move the clamping ring sector 66 and/or punch 65 so as to bring the blank 10 into engagement with the clamping ring sector 66. A cooperating forming arrangement in the form of a pair of cooperating gripping ring sectors 67, 68 are provided for draw forming the blank from the leading edge to the inlet edge of the lip skin sector. Gripping ring sector 68 is an internal gripping ring sector 68 having an external curved surface formed for engaging the internal surface of the blank 10. Gripping ring sector 67 is an external gripping ring sector 67 having an internal curved surface formed for engaging the external surface of the blank 10.

Gripping ring sector 67 has an interior curved surface formed for nesting engagement with the exterior curved surface of the gripping ring sector 68 with clearance for the thickness of the blank 10. The operator actuates a powered actuation system to move the griping ring sector 68 into engagement with the blank 10 and then moves the gripping ring sector 67 into engagement with the blank. The leading edge of the gripping ring sector 67 is radiused to allow the blank 10 to flow through and around the leading edge during the redraw forming process.

The processing steps are shown in FIGS. 17A to 17F. The blank 10 is placed between the blank holder 52 and die 53 before closing. The die 53 or blank holder 52 is then closed vertically. During this closing stage a force FBH-Clamp is applied to the blank holder 52 by a die cushion action from the die 53 or an additional actuation system in a preferably vertical direction 18. The blank 10 is then drawn over the punch 52 by a distance D Draw as shown in FIG. 17B while applying the force FBH-Draw. The blank 10 is free to draw in a controlled fashion from between the blank holder 52 and die 53 through the die cavity 57 as shown in FIG. 17B.

Upon reaching the draw depth D Draw the blank holder load is increased to FBH-Stretch see FIG. 17C while the blank 10 is stretched from all sides over the punch 52 by a distance D Stretch. The blank 10 has minimal draw from between the blank holder 52 and die 53 during the stretching process see FIG. 17C. At this stage the inlet cowl profile from the leading edge 3 to the trailing edge 1 has been formed.

The blank 10 is then sheared along two axial lines either in the tooling system or by removing the part from the tooling system and using either a manual or CNC cutting process. The blank is then placed into the second tooling system see FIG. 17D and a load F BH RR Draw is applied. The blank holder 52 and die 53 remain in the D Fixed position while the load FGrip-RR Draw is applied to the gripping ring sectors 67, 68 see FIG. 12D while the gripping ring sectors 67, 68 are forced into the punch 65 by a distance DRR-Draw under gripping force load of F Grip RR-Draw see FIG. 17E.

Once the distance DRR-Draw has been reached a stretching load Fstretch RR draw is applied to the gripping ring sectors 67, 68 which then reduces or eliminates the draw of the blank 10 between the gripping ring sectors 67, 68. The blank 10 is then formed under tension for the remainder of the motion DRR-Stretch while the forces FBH RR stretch and F Grip RR-Stretch are maintained see FIG. 17F. The blank 10 is then removed by removing all holding forces, retracting the gripping ring sectors 67, 68 and lifting the clamping ring sector and the gripping ring sector clear. The blank 10 is then trimmed using either a manual or CNC cutting process.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. An apparatus for forming a sector of an annular component, comprising:
   means for securely retaining at least a portion of a blank mountable thereon;
   wherein the retaining means is adapted for leaving a portion of the retainable blank accessible;
   a punch having an external surface contour shaped to correspond to the shape of all or a part of the profile of the sector of the annular component from a trailing edge to a leading edge or from a leading edge to an inlet edge;
   wherein the punch or the retaining means is capable of radial movement so that the punch is capable of coming into contact with the accessible portion of the blank for forming the blank from the trailing edge to the leading edge;
   wherein the retaining means is adapted for allowing controlled flow of the blank material through the retaining means as the punch comes into contact with the blank for draw forming the blank across the punch;
   cooperating forming means for forming the profile of the sector of the annular component from the leading edge to the inlet edge;
   wherein the retaining means is adapted for forming a clamping boundary enclosing the accessible part of the blank to be formed by the punch;
   wherein the retaining means is adapted to define a gap for facilitating location of the punch;
   wherein the retaining means comprises a blank holder and a die; and
   wherein the die is a die plate which has a cut out and the blank holder has a cutout defining the gap and being formed for alignment with the cutout of the die plate in use.

2. The apparatus as claimed in claim 1, wherein the retaining means is adapted to create a continuous clamping boundary enclosing the accessible part of the blank to be formed by the punch.

3. The apparatus as claimed in claim 1, wherein the retaining means forms a frame enclosing the accessible part of the blank to be formed by the punch.

4. The apparatus as claimed in claim 1, wherein the cooperating forming means are adjustable in an axial direction.

5. The apparatus as claimed in claim 1, wherein at least part of the retaining means is capable of operating as at least part of the cooperating forming means for draw forming the sector of the annular component from the leading edge to the inlet edge.

6. The apparatus as claimed in claim 1, wherein the punch has an outer surface contour and a forming end shaped to correspond to the shape of the profile of the formed sector of the annular component from the trailing edge to the inlet edge.

7. The apparatus as claimed claim 1, wherein the external surface of the punch is optimized for springback or the external surface of the punch has a high surface finish for reducing friction during forming or the trailing edge of the punch has a radius.

8. The apparatus as claimed in claim 1, wherein the external surface contour of the blank holder and the internal surface contour of the die for engaging the blank correspond to the surface contour of a formed sector of an annular component.

9. The apparatus as claimed in claim 1, wherein the shape of the cut out is designed to match the shape of the punch with a small clearance for the blank material thickness.

10. The apparatus as claimed in claim 1, wherein the corners of the cut out of the die plate or blank holder are rounded or the boundary between the internal surface of the die plate and at least part of an internal peripheral surface of the cutout proximal to the blank is rounded by a radius for providing controlled material flow during the draw forming operation.

11. The apparatus as claimed in claim 1, wherein the die has a movable portion capable of being moved relative to the remainder of the die when the blank is clamped between the die and blank holder.

12. The apparatus as claimed in claim 1, wherein the die comprises a die plate and a support means around all or part of the perimeter of the die plate.

13. The apparatus as claimed in claim 1, wherein the punch comprises an internal grip, the internal grip having a profile for matching an internal profile of the forming punch.

14. The apparatus as claimed in claim 13, wherein the internal grip is movable in the axial direction with a resisting force provided by an integrated actuation system or biasing means.

15. The apparatus as claimed in claim 13, wherein the internal grip provides a second part of the cooperating forming means working together with the movable portion of the die.

16. The apparatus as claimed in claim 13, wherein the internal grip is alignable with the movable portion of the die as the punch forms the trailing edge to the leading edge of the lipskin sector.

17. The apparatus as claimed in claim 1, wherein the apparatus comprises two separate draw forming tools.

18. The apparatus as claimed in claim 17, wherein a first tool has a blank holder and die for retaining the blank there between with alignable cutouts formed for receiving a punch.

19. The apparatus as claimed in claim 18, wherein a second tool comprises:
- a sector of a punch formed for receiving the blank, the form of the punch sector corresponding closely to the form of the leading edge of the punch of the first tool or being that punch so as to neatly accommodate the blank and a clamping ring sector formed for nesting engagement with the punch with clearance for the thickness of the blank; and
- a cooperating forming arrangement in the form of a pair of cooperating gripping ring sectors provided for draw forming the blank from the leading edge to the inlet edge of the sector of the annular component.

20. The apparatus as claimed in claim 11, wherein actuation of the movable portions is provided by an actuation means, wherein the actuation means includes a hydraulic or electromechanical actuation system capable of causing radial motion of the punch or retaining means and is capable of causing axial motion of the cooperating forming means.

* * * * *